US 6,712,892 B2

(12) United States Patent
Andrievsky et al.

(10) Patent No.: US 6,712,892 B2
(45) Date of Patent: *Mar. 30, 2004

(54) INK JET PRINTING PROCESS

(75) Inventors: Andrei Andrievsky, Webster, NY (US); David T. Southby, Rochester, NY (US); Samuel Chen, Penfield, NY (US); Dale E. Decann, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/232,058

(22) Filed: Aug. 30, 2002

(65) Prior Publication Data

US 2004/0040465 A1 Mar. 4, 2004

(51) Int. Cl.⁷ .............................. C09D 11/02; B41J 2/01
(52) U.S. Cl. ................. 106/31.49; 106/31.33; 106/31.65; 106/31.78
(58) Field of Search .................. 106/31.49, 31.78, 106/31.33, 31.65; 347/100

(56) References Cited

U.S. PATENT DOCUMENTS

| | | | | |
|---|---|---|---|---|
| 4,554,555 A | * | 11/1985 | Aruga et al. | 347/96 |
| 4,632,703 A | * | 12/1986 | Koike et al. | 106/31.46 |
| 5,123,960 A | * | 6/1992 | Shirota et al. | 106/31.46 |
| 5,759,254 A | * | 6/1998 | Macpherson et al. | 106/410 |
| 5,922,116 A | * | 7/1999 | Mistry et al. | 106/31.47 |
| 5,922,118 A | | 7/1999 | Johnson et al. | 106/31.6 |
| 6,015,896 A | * | 1/2000 | Mistry et al. | 540/134 |
| 6,149,722 A | * | 11/2000 | Robertson et al. | 106/31.49 |
| 6,190,422 B1 | * | 2/2001 | Carr | 8/445 |
| 6,235,097 B1 | * | 5/2001 | Kenworthy et al. | 106/31.49 |
| 6,332,918 B1 | * | 12/2001 | Kenworthy | 106/31.49 |
| 6,454,845 B1 | * | 9/2002 | Shawcross et al. | 106/31.49 |
| 6,517,621 B2 | * | 2/2003 | Andrievsky et al. | 106/31.49 |
| 6,547,865 B2 | * | 4/2003 | Andrievsky et al. | 106/31.49 |
| 6,569,212 B2 | * | 5/2003 | Carr | 8/445 |

FOREIGN PATENT DOCUMENTS

| | | |
|---|---|---|
| EP | 0 904 327 | 8/2001 |
| WO | WO 97/47699 | 12/1997 |

* cited by examiner

*Primary Examiner*—Helene Klemanski
(74) *Attorney, Agent, or Firm*—Harold E. Cole; Chris P. Konkol

(57) ABSTRACT

An ink jet printing process having the steps of: A) providing an ink jet printer that is responsive to digital data signals; B) loading the printer with ink jet recording elements having a support having thereon an image-receiving layer; C) loading the printer with an ink jet ink composition including water, humectant and a metallized, phthalocyanine colorant, the metallized, phthalocyanine colorant having the formula: $MPc(SO_3X)_a(SO_2NRR')_b$, wherein: M represents a metal; Pc represents a phthalocyanine nucleus; each X independently represents hyrdrogen, alkali metal or an organic cation; a is from 0 to 3; b is from 1 to 4; each R independently represents a substituted or unsubstituted alkyl group having from 1 to about 15 carbon atoms, a substituted or unsubstituted aryl group, or a substituted or unsubstituted heterocyclic group; and each R' independently represents R or hydrogen; with the proviso that a+b is an average of from 2 to 4; and with the further proviso that at least about 50 wt. % of the metallized, phthalocyanine colorant is present in the composition as particles; and D) printing on the image-receiving layer using the ink jet ink in response to the digital data signals.

17 Claims, No Drawings

INK JET PRINTING PROCESS

CROSS REFERENCE TO RELATED APPLICATIONS

Reference is made to commonly assigned, co-pending U.S. Patent Applications:

Ser. No. 10/232,035 by Andrievsky et al., filed concurrently herewith entitled "Ink Jet Ink Composition";

Ser. No. 10/231,836 by Adrievsky et al., filed concurrently herewith entitled "Ink Jet Ink Composition"; and Ser. No. 10/231,837 by Andrievsky et al., filed concurrently herewith entitled "Ink Jet Printing Process".

FIELD OF THE INVENTION

This invention relates to an ink jet printing process using an ink jet ink composition for improving the ozone and light stability of an ink jet image.

BACKGROUND OF THE INVENTION

Ink jet printing is a non-impact method for producing images by the deposition of ink droplets in a pixel-by-pixel manner to an image-recording element in response to digital signals. There are various methods that may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant that is molecularly dispersed or solvated by a carrier medium. The carrier medium can be a liquid or a solid at room temperature. A commonly used carrier medium is water or a mixture of water and organic co-solvents. Molecules of the carrier medium surround each individual dye molecule. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

A pigment is a colorant that is insoluble in the carrier medium, but is dispersed or suspended in the form of small particles, often stabilized against flocculation and settling by the use of dispersing agents. Many such compounds are known and are commercially used. Color Index International (publication by the Society of Dyers and Colorists, 1997) lists various classes of pigments. It is common practice to produce pigment compositions in the form of finely divided dispersions, which may be generated by well-known methods such as ball milling. In order to obtain the optimum dispersion properties it is common to have present at least one dispersant, and the choice of dispersant is important for achieving acceptable pigment dispersion properties. The purpose of the dispersant is to stabilize the particles and to prevent growth by aggregation and flocculation. However, merely adsorbing a dispersant to the pigment surface may lead to competition for such dispersant from solvents and humectants used in the ink formulation and may lead to desorption. In general, such systems may also suffer from a dependence on the concentration of the pigment, the type of humectants used, and the temperature and pH of the formulation containing the pigment. Therefore, it is often difficult to identify an acceptable dispersant which provides the needed ink stability and is compatible with other components in the ink formulation.

Images obtained from pigment-based inks generally have better light-fastness and ozone-fastness than that of the images obtained from dye-based inks. It is especially true when these are used with a recording element containing a porous image-receiving layer. However, pigment based inks have not received a wide degree of acceptance in ink jet ink systems, because of problems associated with the preparation, performance and reliability of the composition, such as dispersibility, print properties, dispersion stability, latency, smear, and gloss.

When a pigment-based ink is formulated, a dispersant is normally used along with a milling or physical grinding step. Alternatively, after milling, the pigment surface may be chemically modified to render the particles dispersible in an aqueous formulation. However, there is a problem with these techniques in that they take time and are expensive. It would be desirable to find alternative colorants having the image permanence of pigments but which do not require milling.

U.S. Pat. No. 5,922,118, EPA 0904327, and WO9747699 disclose surface-modified pigments, wherein such surface modification comprises ionic or ionizable groups for improvement of pigment dispersibility. However, these pigments still require a milling step.

It is an object of the invention to provide an ink jet printing process using an ink jet ink composition that employs self-dispersed particles that do not require milling or grinding and do not require the use of a dispersant.

SUMMARY OF THE INVENTION

This and other objects are achieved in accordance with the present invention that comprises an ink jet printing method comprising the steps of:

A) providing an ink jet printer that is responsive to digital data signals;

B) loading the printer with ink jet recording elements comprising a support having thereon an image-receiving layer;

C) loading the printer with an ink jet ink composition comprising water, humectant and a metallized, phthalocyanine colorant, the metallized, phthalocyanine colorant comprising the formula:

$MPc(SO_3X)_a(SO_2NRR')_b$ wherein: M represents a metal;
Pc represents a phthalocyanine nucleus;
each X independently represents hydrogen, alkali metal or an organic cation, such as Na, Li, or ammonium;
a is from 0 to 3;
b is from 1 to 4;
each R independently represents a substituted or unsubstituted alkyl group having from 1 to about 15 carbon atoms, a substituted or unsubstituted aryl group, or a substituted or unsubstituted heterocyclic group;

each R' independently represents R or hydrogen; with the proviso that a+b is an average of from 2 to 4; and with the further proviso that at least about 50 wt. % of said metallized, phthalocyanine colorant is present in said composition as particles; and D) printing on the image-receiving layer using the ink jet ink in response to the digital data signals.

It was found that the ozone and light stability of an ink jet image was improved when printing using the composition described herein.

DETAILED DESCRIPTION OF THE INVENTION

In a preferred embodiment of the invention, R in the above formula represents a substituted or unsubstituted alkyl group having from 1 to about 15 carbon atoms containing a hydroxy group, a substituted or unsubstituted aryl group containing a hydroxy group or a substituted or unsubstituted heterocyclic group containing a hydroxy group. In another preferred embodiment, M in the above formula represents copper, nickel, aluminum, zinc, iron or cobalt. In another preferred embodiment, R in the above formula represents $CH_2CH_2OH$. In another preferred embodiment, M represents Cu or Ni and R is $CH_2CH_2OH$. In another preferred embodiment, at least about 70 wt. %, more preferably 80 wt. % of the metallized, phthalocyanine colorant is present in said composition as particles. In another preferred embodiment, the particles are less than about 0.3 μm, more preferably less than about 0.1 μm in size.

In another preferred embodiment of the invention, the metallized, phthalocyanine colorants that may be used include the following:

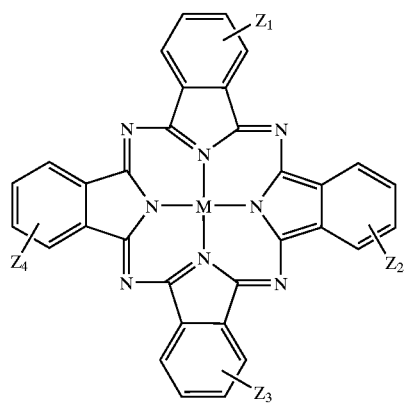

TABLE 1

| Colorant | M | $Z_1$ | $Z_2$ | $Z_3$ | $Z_4$ | Substitution |
|---|---|---|---|---|---|---|
| 1 | Cu | DA | DA | DA | DA | 4, 4', 4", 4''' |
| 2 | Cu | SX | DA | DA | DA | 4, 4', 4", 4''' |
| 3 | Cu | SX | SX | DA | DA | 4, 4', 4", 4''' |
| 4 | Cu | SX | SX | SX | DA | 4, 4', 4", 4''' |
| 5 | Cu | DA | DA | DA | DA | random |
| 6 | Cu | SX | DA | DA | DA | random |
| 7 | Cu | SX | SX | DA | DA | random |
| 8 | Cu | SX | SX | SX | DA | random |
| 9 | Cu | DA | DA | DA | N/S | random |
| 10 | Cu | SX | DA | DA | N/S | random |
| 11 | Cu | SX | SX | DA | N/S | random |
| 12 | Cu | DA | DA | N/S | N/S | random |
| 13 | Cu | SX | DA | N/S | N/S | random |

TABLE 1-continued

| Colorant | M | $Z_1$ | $Z_2$ | $Z_3$ | $Z_4$ | Substitution |
|---|---|---|---|---|---|---|
| 14 | Ni | DA | DA | DA | DA | 4, 4', 4", 4''' |
| 15 | Ni | SX | DA | DA | DA | 4, 4', 4", 4''' |
| 16 | Ni | SX | SX | DA | DA | 4, 4', 4", 4''' |
| 17 | Ni | SX | SX | SX | DA | 4, 4', 4", 4''' |
| 18 | Cu | EA | EA | EA | EA | 4, 4', 4", 4''' |
| 19 | Cu | SEA | EA | EA | EA | random |
| 20 | Ni | SEA | SEA | EA | EA | 4, 4', 4", 4''' |
| 21 | Ni | SEA | SEA | SEA | EA | random |
| 22 | Cu | EA | EA | EA | DA | 4, 4', 4", 4''' |
| 23 | Cu | SEA | EA | EA | DA | random |
| 24 | Ni | SEA | SEA | EA | EA | 4, 4', 4", 4''' |
| 25 | Co | SEA | SEA | SEA | EA | random |
| 26 | Cu | DA | DA | EA | N/S | random |
| 27 | Cu | SX | DA | EA | N/S | random |
| 28 | Cu | SX | SEA | DA | N/S | random |
| 29 | Cu | DA | EA | N/S | N/S | random |
| 30 | Ni | SX | DA | N/S | N/S | random |
| 31 | Cu | SPY | SPY | SPY | SNa | random |
| 32 | Cu | SPY | SPY | SPH | SNa | random |
| 33 | Ni | SPY | SPY | SNa | SNa | random |
| 34 | Ni | SPY | SPY | SPH | SNa | random |
| 35 | Cu | SPY | SPY | SPH | SNa | 4, 4', 4", 4''' |
| 36 | Ni | SPY | SPY | SPH | SNa | 4, 4', 4", 4''' |

Where:
$SX = SO_3^-H_2N^+(CH_2CH_2OH)_2$;
$DA = SO_2N(CH_2CH_2OH)_2$;
$EA = SO_2NHCH_2CH_2OH$;
$SEA = SO_3^-H_3N^+CH_2CH_2OH$;

SPY = 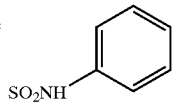

SPH = 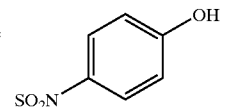

$SNa = SO_3^-Na^+$
N/S = no substituent.

Electrophilic substitution or construction of the phthalocyanine nucleus leads to a mixture of products. In each aromatic ring, as shown in the generalized structure below, substitution may occur at one of the 4 or 4a positions, which are equivalent, or at one of the 3 or 3a positions, which are equivalent.

Numbering of Position of Substitution

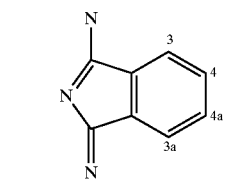

The descriptors in Table 1a, 'Substitution' column have the following meanings: 4, 4', 4", 4''': substitution occurred to give one substituent in each aromatic ring at a 4 or 4a position; random:where substitution occurred, the substituent is present in one of the 3, 4, 4a or 3a positions in each aromatic ring.

Colorant A Composition is predominantly a mixture of Colorants 1–4 and includes positional isomers of Colorants 1–4;

Colorant B Composition is predominantly a mixture of Colorants 5–13 and includes positional isomers of Colorants 5–13;

Colorant C Composition is predominantly a mixture of Colorants 14–17 and includes positional isomers of Colorants 14–17.

The colorants described above may be employed in any amount effective for the intended purpose. In general, good results have been obtained when the colorant is present in an amount of from about 0.2 to about 10 wt. %, the humectant is present in an amount of from about 5 to about 70 wt. %, and the balance is water. A dye may also be added to the ink jet ink composition if desired.

The support for the ink jet recording element used in the invention can be any of those usually used for ink jet receivers, such as paper, resin-coated paper, plastics such as a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, and microporous materials such as microvoided polyester described in copending U.S. Ser. No. 09/656,129, filed Aug. 29, 2000, polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. The thickness of the support employed in the invention can be, for example, from about 12 to about 500 $\mu$m, preferably from about 75 to about 300 $\mu$m.

Antioxidants, antistatic agents, plasticizers and other known additives may be incorporated into the support, if desired. In a preferred embodiment, paper is employed.

In a preferred embodiment of the invention, the ink-receiving layer is porous and contains inorganic particles such as silica, alumina, titanium dioxide, clay, calcium carbonate, barium sulfate, or zinc oxide. In another preferred embodiment, the porous ink-receiving layer comprises from about 30 wt. % to about 95 wt. % inorganic particles and from about 5 wt. % to about 70 wt. % polymeric binder, such as gelatin, poly(vinyl alcohol), poly(vinyl pyrrolidinone) or poly(vinyl acetate). The porous ink-receiving layer can also contain organic beads or polymeric micro-porous structures without inorganic filler particles as shown in U.S. Pat. Nos. 5,374,475 and 4,954,395, the disclosures of which are hereby incorporated by reference.

Examples of binders which may be used in the image-receiving layer include polyvinyl alcohol, polyvinyl pyrrolidone, poly(ethyl oxazoline), non-deionized or deionized Type IV bone gelatin, acid processed ossein gelatin or pig skin gelatin. The hydrophilic polymer may be present in an amount of from about 0.4 to about 30 g/m$^2$, preferably from about 1 to about 16 g/m$^2$.

The pH of the aqueous ink compositions employed in the invention may be adjusted by the addition of organic or inorganic acids or bases. Useful inks may have a preferred pH of from about 2 to 9, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

One or more humectants are employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. Preferred humectants for the composition employed in the invention are diethylene glycol, glycerol, and diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic. A preferred surfactant for the ink composition of the present invention is Surfynol® 465 (Air Products) at a final concentration of 0.1% to 1.0%.

A biocide may be added to the composition employed in the invention to suppress the growth of micro-organisms such as molds, fungi, etc. in aqueous inks. A preferred biocide for the ink composition of the present invention is Proxel® GXL (Zeneca Specialties Co.) at a final concentration of 0.05–0.5 wt. %.

A typical ink composition employed in the invention may comprise, for example, the following substituents by weight: colorant (0.2–5%), water (20–95%), humectant (5–70%), water miscible co-solvents (2–20%), surfactant (0.1–10%), biocide (6.05–5%) and pH control agents (0.1–10%).

Additional additives that may optionally be present in the ink jet ink composition employed in the invention include thickeners, conductivity enhancing agents, anti-kogation agents, drying agents, and defoamers.

The image-recording layer used in the process of the invention employing the composition described above can also contain various known additives, including matting agents such as titanium dioxide, zinc oxide, silica and polymeric beads such as crosslinked poly(methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; water-proofing agents; dispersing agents; UV-absorbing agents; mildew-proofing agents; mordants; antistatic agents, antioxidants, optical brighteners, and the like. A hardener may also be added to the ink-receiving layer if desired.

In order to improve the adhesion of the image-recording layer to the support, the surface of the support may be subjected to a treatment such as a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 µm.

The image-recording layer may be present in any amount that is effective for the intended purpose. In general, good results are obtained when it is present in an amount of from about 2 to about 46 g/m$^2$, preferably from about 6 to about 16 g/m$^2$, which corresponds to a dry thickness of about 2 to about 42 µm, preferably about 6 to about 15 µm.

The following examples are provided to illustrate the invention.

EXAMPLES

Synthesis of Colorant A Composition

Colorant A Composition was prepared from Copper (II) phthalocyanine 4,4',4'',4'''-tetrasulfonic acid or its salts which was made according to JP00303009A.

Copper (II) phthalocyanine 4,4',4'',4'''-tetrasulfonic acid (5 g) was suspended in sulfolane (100 ml), and thionyl chloride (100 ml) was added all at once followed by dimethylformamide (0.5 g). The mixture was refluxed for 48 hours, insolubles were filtered off and discarded, and excess thionyl chloride was evaporated using a rotary evaporator. Diethanolamine (19 g) was then added while stirring and keeping the reaction temperature between 45 and 55° C. After stirring for 2 hours at 55° C., diisopropyl ether (250 ml) was added to the resulting reaction mixture, and stirring was continued for 2 hours at ambient temperature. The colorless layer was decanted, and isopropyl alcohol (250 ml) was added. The mixture was stirred for 6 hrs at ambient temperature. The precipitate was filtered, washed with ethanol (200 ml) at 70° C. and dried in vacuo to give Colorant A Composition (4.3 g).

Synthesis of Colorant B Composition

Colorant B Composition was made the same as Colorant A Composition except Direct Blue 199, sulfonated copper phthalocyanine dye, obtained by freeze drying an aqueous solution available from Tricon, Inc. was used as the starting material.

Synthesis of Colorant C Composition

Colorant C Composition was made the same as Colorant A Composition except Nickel (II) phthalocyanine 4,4',4'',4'''-tetrasulfonic acid was used as the starting material.

Receiving Elements

The following commercially-available receiving elements with a porous image-receiving layer were used:

Receiving Element 1

Kodak Professional Inkjet Products, Instant-Dry Photographic Glossy Paper, CAT 8987752.

Receiving Element 2

Konica Photo Quality Ink Jet Paper QP, No: KJP-LT-GH-15-QP PI.

Ink Preparation

Inks were formulated to give a maximum density of approximately 1.2–1.4, when printed onto the above receiving elements using a Lexmark Z51®, thermal head printer. The concentration of colorants in the formulation could be adjusted to achieve other levels of coverage. Inks for printing via a Piezo head using a Mutoh 4100® wide format printer are described hereinafter.

Thermal Formulations

1) Ink from Colorant C Composition

Colorant C Composition (0.338 g) was stirred overnight with water (2 g) and a solution (5 g) containing glycerol (37% by weight), diethylene glycol (12.5%), and butoxytriglycol (14%) in water (to 100%). Once no solids remained, a further quantity of water (2.66 g) was added to generate 10 g of ink. This ink was filtered through a 0.45 µm polytetrafluoroethylene filter pad then loaded into a Lexmark cartridge to be printed using a Lexmark Z51® printer.

2) Ink from Colorant C Composition/Direct Blue 199 (Tricon, Inc. Green Shade 1837-P) Mixture 10 g sample of ink was prepared similar to 1) from Colorant C Composition (0.169 g) and DB-199 concentrate (1.171 g).

3) Ink from Colorant A Composition 10 g sample of ink was prepared similar to 1) from Colorant A Composition (0.21 g) to print to a maximum density of approximately 1.0.

4) Ink from Colorant B Composition 10 g sample of ink was prepared similar to 1) from Colorant B Composition (0.21 g) to print to a maximum density of approximately 1.0.

C-1 Comparison Ink from Direct Blue 199 (Tricon. Inc. Green Shade 1837-P)

10 g sample of ink was prepared similar to 1) from the dye aqueous DB-199 concentrate (2.342 g).

C-2 Comparison Ink from Avecia Pro-Jet™ Fast Cyan 2 (Liquid)

10 g sample of ink was prepared similar to 1) from the dye aqueous concentrate (1.523 g).

C-3 Ink from Bayer Bayscript Cyan BA™

10 g sample of ink was prepared similar to 1) from the dye aqueous concentrate (0.9 g).

Piezo Light Cyan Ink Formulations

These were prepared to have viscosity in the range of 2.8–3.0 cp. and were adjusted to a pH of about 8.1.

5) Ink from Colorant A Composition

For 80 g of ink, Colorant A Composition (1.6 g) was stirred overnight with a mixture of glycerol (3.44 g), diethylene glycol (6.8 g), butoxytriglycol (6.4 g), 2-pyrrolidinone (3.44 g) and water (58.32 g). The pH of the mixture was measured and adjusted to pH=8.18 by careful addition of a dilute solution of triethanolamine. The mixture was filtered through a 0.45 µm polytetrafluoroethylene filter pad then loaded ready for printing using a Mutoh 4100®, wide format printer.

6) Ink from Colorant B Composition

This ink was prepared the same as 5) above except using the dye (1.6 g), glycerol (8.0 g), diethylene glycol (8.0 g), butoxytriglycol (6.4 g), and water (56.0 g).

C-4 Comparison Ink from Avecia Pro-Jet™ Fast Cyan 2 (Liquid)

This ink was prepared the same as 5) above except using the dye concentrate (6% dye, 16 g), glycerol (9.4 g), diethylene glycol (10.8 g), butoxytriglycol (5.6 g), and water (38.2 g).

Evaluation

Various test targets were printed, using a variety of ink jet receiving elements, to allow examination of several density level patches (approx. 10 mm square) ranging from 100% dot coverage to less than 25% dot coverage. Printed samples were then subjected to image stability testing under a variety of conditions. These tests are described below. Typically the Status A red reflection density of the 100% and 75% dot coverage (or other) patches on a fresh sample were measured using an X-Rite 820® densitometer, corrected for the color of the receiver, and recorded. That sample was subjected to a test described below and re-read. The percentage of dye density remaining relative to the fresh sample was calculated, to give a measure of colorant fastness on a particular receiver. These data are given in Table 2 below.

Atmospheric Contaminants Test

Printed samples were mounted in a darkened chamber maintained at room temperature, with a constant atmosphere containing 5 ppm of Ozone, and at a relative humidity of approximately 50%. The samples were removed after a time period of 24 hours. The results are shown in Tables 2 and 3 below.

High Intensity Simulated Daylight Fading (HID) test

Samples were mounted in a temperature and humidity controlled chamber where they were subjected to 50 Klux light exposure from a filtered xenon light source, designed to match the spectral characteristics of daylight, for a period of two weeks. The results are shown in the Tables below.

Printing of Test Images Using a Thermal Head

To print using a thermal head, the above prepared inks 1–4 and C-1 to C-3 were placed into empty Lexmark ink cartridges, No. 15MO120, and fitted into the ink station of a Lexmark Z51® printer. They were printed on to receiving elements 1 and 2 as shown in Tables 2 and 3.

TABLE 2

| | | Atmospheric Contaminants Test (% retained) | | HID, Light Fastness Test (% retained) | |
|---|---|---|---|---|---|
| Ink | Receiving Element | 100% dot coverage | 75% dot coverage | 100% dot coverage | 75% dot coverage |
| C-1 | 1 | 30% | 33% | 86% | 84% |
| C-1 | 2 | 29% | 32% | 79% | 75% |
| 1 | 1 | 98% | 95% | 104% | 101% |
| 1 | 2 | 97% | 97% | 99% | 102% |
| 2 | 1 | 77% | 76% | 94% | 93% |
| 2 | 2 | 72% | 70% | 94% | 89% |

The above results show that on either receiving element, the inventive ink compositions 1 and 2 show considerable improvements in the light fastness and ozone fastness over that of the comparison ink composition.

TABLE 3

| | | Atmospheric Contaminants Test (% retained) | | HID, Light Fastness Test (% retained) | |
|---|---|---|---|---|---|
| Ink | Receiving Element | 100% dot coverage | 75% dot coverage | 100% dot coverage | 75% dot coverage |
| C-1 | 1 | 21% | 23% | 75% | 75% |
| C-1 | 2 | 28% | 29% | 70% | 65% |
| C-2 | 1 | 28% | 29% | 69% | 66% |
| C-2 | 2 | 24% | 28% | 56% | 49% |
| C-3 | 1 | 45% | 47% | 84% | 82% |
| C-3 | 2 | 46% | 47% | 82% | 79% |
| 3 | 1 | 92% | 89% | 98% | 96% |
| 3 | 2 | 94% | 94% | 100% | 97% |
| 4 | 1 | 91% | 93% | 99% | 99% |
| 4 | 2 | 93% | 93% | 98% | 98% |

The above results show that on either receiving element the inventive ink compositions 3 and 4 show considerable improvements in the light fastness and ozone fastness over that of the comparison ink composition C-1, C-2 and C-3.

Printing of Test Images Using a Piezo Head

To print using a Piezo head, inks C-4, 5 and 6 were placed in empty ink sachets, the remaining air was removed by bleeding and the sachets were fitted into a bay of the Mutoh 4100® printer. The following results were obtained:

TABLE 4

| | | Atmospheric Contaminants Test (% retained) | | HID, Light Fastness Test (% retained) | |
|---|---|---|---|---|---|
| Ink | Receiving Element | Maximum density | Density = 1 | Maximum density | Density = 1 |
| C-4 | 1 | 24% | 23% | 75% | 71% |
| C-4 | 2 | 25% | 25% | 55% | 55% |
| 5 | 1 | 97% | 92% | 98% | 99% |
| 5 | 2 | 99% | 98% | 99% | 99% |
| 6 | 1 | 88% | 91% | 97% | 97% |
| 6 | 2 | 88% | 88% | 95% | 94% |

The above results show that the inventive inks are better than the comparison ink for stability to fading by light and by atmospheric contaminants such as ozone.

Physical Nature of the Inventive Colorants in the Inks by Microscopy

Four thermal ink samples (1–3 and C-1 were analyzed by transmission electron microscopy (TEM) using a JEM-2000FX® operated at either 200 or 100 kV accelerating voltage, and by optical microscopy (OM) at magnifications up to 1000×in an Olympus BX30® microscope. For direct microscopy examination of ink formulations, suitable samples were prepared by spreading a small drop of the ink onto a carbon film supported on 200 mesh aluminum TEM grid (SPI Inc., West Chester, Pa. 19381). The complementary observation of ink written onto the receiving elements set forth in the invention was performed using suitable cross-sectioned samples, prepared by cryomicrotomy in a Reichert Ultracut S® microtome, equipped with a Reichert FCS® cryo-temperature attachment and a diamond knife. Small area composition analysis was carried out with Energy Dispersive Spectroscopy (EDS) using a focused electron beam, ~20 nm in diameter. The method used follows the standard analysis technique as outlined in published books (e.g. see "Principles of Analytical Electron Microscopy", Chapters 4 and 5, Edit. D. C. Joy, A. D. Romig, and J. I. Goldstein, Plenum Press, New York, 1989).

For ink 1, TEM analysis revealed the ink contained a non-uniform microstructure consisting mostly of spherically shaped islands, and occasionally, irregularly shaped facetted particulates. The former exhibited uniform contrast in the TEM, indicating that they are amorphous solids, and were found to have the size range approximately between 10 and 20 nm. Further, these islands are found to comprise agglomerates of amorphous colorant solids, and as such are larger than the individual colorant particles. The facetted particulates showed black and white contrast indicating crystalline characteristics, and they ranged from ~40 to 100 nm. Both the islands and particulates were found to contain Ni and S by EDS, consistent with the colorant composition. For ink written on receiving element 1, TEM observations revealed a distinct layer of colorant deposited at the surface. At 100% dot coverage using the Lexmark Z51® printer, this layer thickness was approximately 0 $\mu$m±0.05 $\mu$m. In a complimentary fashion, optical microscopy showed that the colorant had not significantly penetrated into the receiving elements, but instead is confined as a thin layer at the surface. Taken together, the microstructure and composition data indicate that the ink contains a nanoparticulate dispersion of amorphous and crystalline colorants. These characteristics are distinctly different than those found for the comparison ink composition C-1.

For ink 2, TEM results similar to those of 1 were found. The ink dispersion consisted mostly of spherically shaped islands, and occasionally irregularly shaped facetted particulates. The former exhibited uniform contrast in the TEM, indicating their amorphous nature, and were found to be approximately 10–20 nm in size. Further, these islands are found to comprise agglomerates of amorphous colorant solids, and as such are larger than the individual colorant particles. The latter showed black and white contrast, indicating their crystalline matrix, and ranged in size from approximately 40 to 100 nm. Both the islands and the particulates were found to contain Ni, Cu and S, as analyzed by EDS, consistent with the colorant composition. For ink written on receiving element 1, TEM observations revealed a distinct layer of colorant deposited at the surface. At 100% dot coverage using the Lexmark Z51® printer, this layer thickness was approximately 0.1 $\mu$m±0.05 $\mu$m. In a complimentary fashion, optical microscopy showed that the colorant had not significantly penetrated into the receiving elements, but instead is confined as a thin layer at the surface. Taken together, the microstructure and composition data indicate that the ink contains a nanoparticulate dispersion of amorphous and crystalline colorants. These characteristics are distinctly different than those found for the comparison ink composition C-1.

For ink 3, TEM analysis revealed the ink to exhibit microstructural characteristics similar to those of 1 and 2. It consisted of spherically shaped solid islands, and irregularly shaped facetted particulates. The former exhibited uniform contrast in the TEM, indicative of its amorphous matrix, and was found to have sizes ranging from 10–20 nm. Further, these islands are found to comprise agglomerates of amorphous colorant solids, and as such are larger than the individual colorant particles. The latter showed black and white contrast, indicative of its crystalline matrix, and they ranged from approximately 40 to 100 nm. Both the islands and the particulates were found to contain Cu and S, as analyzed by EDS, consistent with its colorant composition. For ink written on receiving element 1, TEM observations revealed a distinct layer of colorant deposited at the surface. At 100% dot coverage using the Lexmark Z51 ® printer, this layer thickness was approximately 0.1 $\mu$m±0.05 $\mu$m. In a complimentary fashion, optical microscopy showed that the colorant had not significantly penetrated into the receiving elements, but instead is confined as a thin layer at the surface. Taken together, the microstructure and composition data indicate that the ink contains a nanoparticulate dispersion of amorphous and crystalline colorants. These characteristics are distinctly different than those found for the comparison ink composition C-1.

For ink C-1, when it was spread out and dried on the carbon film, TEM data showed the ink was uniform in morphology, with no discernible microstructure feature. Under the optical microscope, this dried ink exhibited a cyan color and formed a uniform film. When printed on receiving elements 1 and 2, cross-section TEM data revealed no solid deposit at the surface. Cross-section OM observations showed this colorant had significantly penetrated into the receiving elements. These observations are consistent with the characteristics of soluble dye-based inks that can penetrate into the receiving elements after the ink deposition process.

Physical Nature of the Inventive Colorants in the Inks by Centrifuation

Ink samples 3, 4, C-1 and C-3 were used to fill centrifuge tubes and were subjected to centrifugation for 24 h, using a Beckman Ultra Centrifuge® with conditions of 60000 rpm at 20° C. A 100$\mu$L sample was taken from the top 5 mm of the centrifuge tube, before and after centrifugation. These were diluted with deionized water using the same dilution factor such that the range of absorbance seen when the visible spectra of the samples taken before centrifugation was within the range of the spectrometer. For each sample, the spectral absorbance maximum between 500 nm and 700 nm was recorded before centrifugation ($D_1$) and compared to the absorbance at that wavelength after centrifugation ($D_2$). The ratio of these values $D_2/D_1$ expressed as a percentage is an indicator of the proportion by weight of the colorant in the ink that exists in solution. The value 100–($D_2/D_1$) % is then an indicator of the proportion by weight of the colorant in particulate form. These results are given below.

| Colorant | Ink | 100–($D_2/D_1$)% |
|---|---|---|
| A | 3 | 86% |
| B | 4 | 83% |
| DB199 | C-1 | 34% |
| Bayscript Cyan BA ™ | C-3 | 50% |

The above results show that the invention ink compositions, the colorants exist predominantly as particles that are capable of sedimentation when centrifuged, which is not the case for the comparison ink compositions.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet printing process, comprising the steps of:
   A) providing an ink jet printer that is responsive to digital data signals;

B) loading said printer with ink jet recording elements comprising a support having thereon an image-receiving layer;

C) loading said printer with an ink jet ink composition comprising water, humectant and a metallized, phthalocyanine colorant, said metallized, phthalocyanine colorant comprising the formula:

$$MPc(SO_3X)_a(SO_2NRR')_b$$

wherein:

M represents a metal;

Pc represents a phthalocyanine nucleus;

each X independently represents hydrogen, alkali metal or an organic cation;

a is from 0 to 3;

b is from 1 to 4;

each R independently represents a substituted or unsubstituted alkyl group having from 1 to about 15 carbon atoms, a substituted or unsubstituted aryl group, or a substituted or unsubstituted heterocyclic group; and each R' independently represents R or hydrogen; with the proviso that a+b is an average of from 2 to 4; and with the further proviso that at least about 70 wt. % of said metallized, phthalocyanine colorant is present in said composition as particles; and D) printing on said image-receiving layer using said ink jet ink in response to said digital data signals.

2. The process of claim 1 wherein R represents a substituted or unsubstituted alkyl group having from 1 to about 15 carbon atoms containing a hydroxy group, a substituted or unsubstituted aryl group containing a hydroxy group or a substituted or unsubstituted heterocyclic group containing a hydroxy group.

3. The process of claim 1 wherein M is copper, nickel, aluminum, zinc, iron, or cobalt.

4. The process of claim 1 wherein R is $CH_2CH_2OH$.

5. The process of claim 1 wherein M represents Cu or Ni and R is $CH_2CH_2OH$.

6. The process of claim 1 wherein said colorant is present in an amount of from about 0.2 to about 10 wt. %, said humectant is present in an amount of from about 5 to about 70 wt. %, and the balance is water.

7. The process of claim 1 wherein a is 0 or 1 and b is 3 or 4.

8. The process of claim 1 wherein at least about 80 wt. % of said metallized, phthalocyanine colorant is present in said composition as particles.

9. The process of claim 1 wherein X represents Na, Li, or ammonium.

10. The process of claim 1 which also includes a water-soluble dye.

11. The process of claim 1 wherein said particles are less than about 0.3 µm in size.

12. The process of claim 1 wherein said particles are less than about 0.1 µm in size.

13. The process of claim 1 wherein said support is paper, resin-coated paper or a plastic.

14. The process of claim 1 wherein said image-receiving layer comprises from about 30% to about 95 weight percent inorganic particles and from about 5 to about 70 weight percent of a polymeric binder.

15. The process of claim 1 wherein said image-receiving layer contains organic particles.

16. The process of claim 14 wherein said inorganic particles are silica, alumina, titanium dioxide, clay, calcium carbonate, barium sulfate or zinc oxide.

17. The process of claim 14 wherein said polymeric binder is gelatin, poly(vinyl alcohol), poly(vinyl pyrrolidinone), poly(vinyl acetate) or copolymers thereof.

* * * * *